(12) United States Patent
Kapinos et al.

(10) Patent No.: US 12,223,631 B2
(45) Date of Patent: Feb. 11, 2025

(54) IMAGE ANALYSIS TO IDENTIFY PACKAGE SHOCK

(71) Applicant: Lenovo (Singapore) Pte. Ltd.

(72) Inventors: Robert J Kapinos, Durham, NC (US); Scott Li, Cary, NC (US); Robert James Norton, Jr., Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 378 days.

(21) Appl. No.: 17/700,925

(22) Filed: Mar. 22, 2022

(65) Prior Publication Data

US 2023/0306571 A1    Sep. 28, 2023

(51) Int. Cl.
*G06V 10/00* (2022.01)
*G06T 7/00* (2017.01)

(52) U.S. Cl.
CPC .. *G06T 7/0002* (2013.01); *G06T 2207/10016* (2013.01)

(58) Field of Classification Search
CPC ............. G06T 7/0002; G06T 7/0004; G06T 2207/10016; G06T 2207/30108; G06Q 50/40; G06Q 10/06395; G06Q 10/0832
See application file for complete search history.

(56) References Cited

U.S. PATENT DOCUMENTS

| | | | | |
|---|---|---|---|---|
| 5,600,061 A | * | 2/1997 | Yabushita | G01C 21/26 73/178 R |
| 11,176,659 B1 | * | 11/2021 | Dohner | G06T 7/97 |
| 2006/0092544 A1 | * | 5/2006 | Skaar | G11B 23/046 |
| 2007/0133980 A1 | * | 6/2007 | Meyers | G08B 13/1961 348/E5.042 |
| 2010/0010664 A1 | * | 1/2010 | Kadaba | G05B 19/0428 348/E7.086 |
| 2011/0205376 A1 | * | 8/2011 | Wulff | G03B 17/18 348/E5.031 |
| 2014/0063279 A1 | * | 3/2014 | Ogura | H04N 23/663 348/222.1 |
| 2015/0142380 A1 | * | 5/2015 | Barlow | G01B 21/08 702/182 |
| 2021/0125143 A1 | * | 4/2021 | Bartlett | G06Q 10/0832 |
| 2023/0040344 A1 | * | 2/2023 | Cotte | B65D 79/02 |
| 2023/0115704 A1 | * | 4/2023 | Singh | G06T 5/70 705/333 |
| 2023/0306571 A1 | * | 9/2023 | Kapinos | G06T 7/0002 |

\* cited by examiner

*Primary Examiner* — Amir Alavi
(74) *Attorney, Agent, or Firm* — FERENCE & ASSOCIATES LLC

(57) ABSTRACT

One embodiment provides a method, the method including: receiving, at a shock analysis system, image data corresponding to at least one image capture device and associated with transportation of a package; determining, at the shock analysis system and by analyzing the image data, the package has undergone a shock of a magnitude exceeding a predetermined threshold; and performing, at the shock analysis system and responsive to determining the package has undergone the shock exceeding the predetermined threshold, at least one predetermined action, wherein the at least one predetermined action comprises notifying a user of the shock.

16 Claims, 3 Drawing Sheets

IMAGE ANALYSIS TO IDENTIFY PACKAGE SHOCK

BACKGROUND

Many objects or products are subject to transportation from one location to another, for example, from a manufacturing location to a warehouse to a selling entity or end user. As the objects are moved they are generally packaged in a box or other packaging material in an attempt to help protect the object from damage that may be caused during the transportation process. For example, boxes or other packaging materials may prevent the object from getting dirty, cushion the object in the event of a fall or other shock, transfer damage that could be caused to the object to the packaging, or the like. However, boxes and other packaging materials do not prevent all damage that can occur to objects during the transportation process.

BRIEF SUMMARY

In summary, one aspect provides a method, the method including: receiving, at a shock analysis system, image data corresponding to at least one image capture device and associated with transportation of a package; determining, at the shock analysis system and by analyzing the image data, the package has undergone a shock of a magnitude exceeding a predetermined threshold; and performing, at the shock analysis system and responsive to determining the package has undergone the shock exceeding the predetermined threshold, at least one predetermined action, wherein the at least one predetermined action includes notifying a user of the shock.

Another aspect provides an information handling device, the information handling device including: at least one image capture device; a processor operatively coupled to the at least one image capture device; a memory device that stores instructions that, when executed by the processor, causes the information handling device to: receive, at a shock analysis system, image data corresponding to the at least one image capture device and associated with transportation of a package; determine, at the shock analysis system and by analyzing the image data, the package has undergone a shock of a magnitude exceeding a predetermined threshold; and perform, at the shock analysis system and responsive to determining the package has undergone the shock exceeding the predetermined threshold, at least one predetermined action, wherein the at least one predetermined action includes notifying a user of the shock.

A further aspect provides a product, the product including: a computer-readable storage device that stores executable code that, when executed by a processor, causes the product to: receive, at a shock analysis system, image data corresponding to at least one image capture device and associated with transportation of a package; determine, at the shock analysis system and by analyzing the image data, the package has undergone a shock of a magnitude exceeding a predetermined threshold; and perform, at the shock analysis system and responsive to determining the package has undergone the shock exceeding the predetermined threshold, at least one predetermined action, wherein the at least one predetermined action includes notifying a user of the shock.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
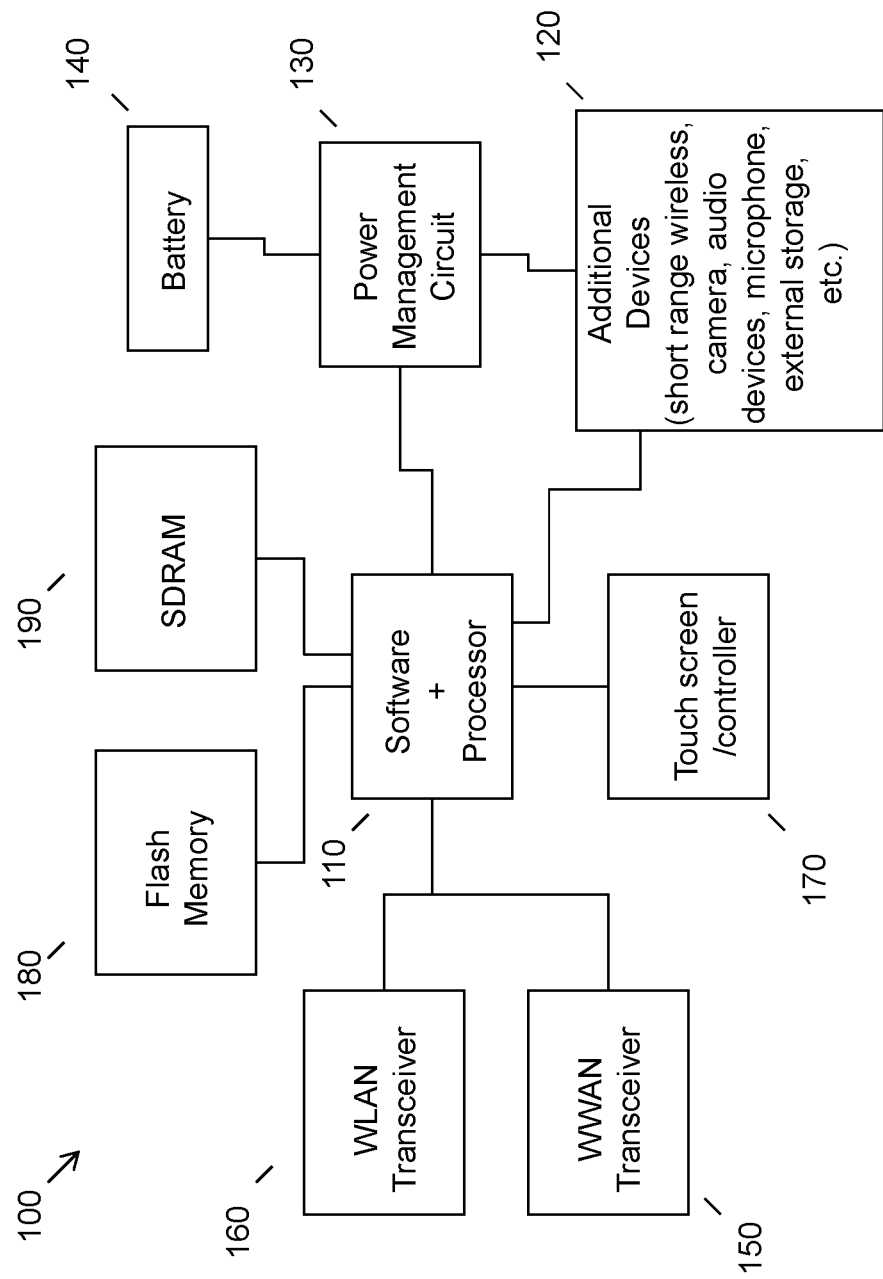
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Sometimes a package undergoes a shock that causes damage to the object within the package with no visible damage to the package itself. Thus, when someone opens the package to retrieve the object, they find that the object has been broken or otherwise damaged. At this point it can become difficult for the consumer to get reimbursed for the object or get a replacement object because there becomes a question regarding whether the object was actually broken during transportation or before it got to the consumer or whether the object was broken by the consumer. However, since it is known that objects can be broken or otherwise damaged by shocks that do not cause visible damage to the packaging, there are some techniques for detecting shocks that occur to packages during transportation.

One technique for detecting shocks is the use of a shock indicator. These devices are placed on a package, either visibly on the outside to monitor the package during transportation, or on the inside of the package which provides an indication to the consumer that the package has undergone a shock. The shock indicators include some kind of indicator that activates if the package undergoes a shock exceeding a particular magnitude. For example, some shock indicators have a liquid or gel within a vial of the shock indicator. If the package undergoes a shock, the vial will break, thereby releasing the liquid and providing a visual indication that the package underwent a shock that may have damaged the object within the package.

One problem with these shock indicators is they have to be unique to each object that is being monitored. Different objects get damaged by different amounts of shock. For example, sensitive electronic devices may be damaged by a much lower magnitude of shock than a children's toy. Thus, using a one-size-fits-all shock indicator will not provide an accurate representation of shocks that may damage objects. Additionally, the shock indicators have an associated cost. While the cost may be worthwhile for more sensitive or expensive objects, the cost may be prohibitive for less costly objects or objects that are less likely to be damaged by a shock. Additionally, once the shock indicator is used once, it cannot be reused, thereby further increasing the cost of the shock indicator. Additionally, other shock indicators use electronic components, for example, accelerometers, gyroscopes, and the like, that can detect movement of the package. However, these are even more expensive than other more conventional shock indicators. A shock indicator may be placed on a pallet of packages to reduce cost and still monitor shocks, but this is only effective when a large group of packages is being transported together.

Accordingly, the described system and method provides a technique for identifying when a package has undergone a shock exceeding a predetermined threshold through image analysis. A shock analysis system receives image data corresponding to at least one image capture device and associated with transportation of a package. The image data may include images of the package as it is transported, images of objects in the environment surrounding the package as it is transported, and/or data corresponding to movement of a camera capturing images of the package or the environment.

Analysis of the image data allows the shock analysis system to determine if the package has undergone a shock of a magnitude that exceeds a predetermined threshold. The threshold value is generally associated with a value that corresponds to a value that will likely cause damage to an object within a package. The shock is identified from a change in velocity. Thus, the analysis is an analysis of velocities of the package, environment objects, or camera movement. Changes in the velocity can be identified that would correspond to a shock that could cause damage to the object within the package. If the analysis concludes that damage to the object is likely (e.g., the change in velocity or shock value exceeds the predetermined threshold, etc.), a predetermined action may be taken including alerting or notifying a user of the shock.

Therefore, a system provides a technical improvement over traditional methods for identifying package shock causing object damage. The described system is able to utilize a camera to monitor multiple packages that are being transported. The camera can be mounted on a package and used to monitor the package and any surrounding packages. The camera may also be mounted on the vehicle used to transport the package(s), for example, a delivery truck, forklift, pallet jack, transportation cart, or the like. This allows all packages included on the vehicle to be monitored with a single shock monitoring device instead of having separate shock monitoring devices for each package. Additionally, packages can be added to and removed from the vehicle without losing the ability to monitor other packages on the vehicle. Thus, unlike conventional techniques which require an individual shock monitoring device and indicator, the described technique allows for multiple packages to be monitored with a single monitoring system, thereby reducing the cost of performing the shock monitoring and identifying shocks that could cause damage to objects within packages.

Additionally, the described system is able to perform the shock analysis and alert a user of the shock, unlike conventional techniques which require the user to visually check the shock indicator to see if a shock has occurred. Thus, the described system also provides a more efficient and effective technique for detecting shocks that may cause damage to an object within a package that does not require as much interaction from a user. Finally, the described system provides techniques for analyzing multiple reference points to detect a possible shock to a package, thereby allow for more flexibility in implementing the described system as compared to conventional techniques that require the shock monitor be affixed to the package itself.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
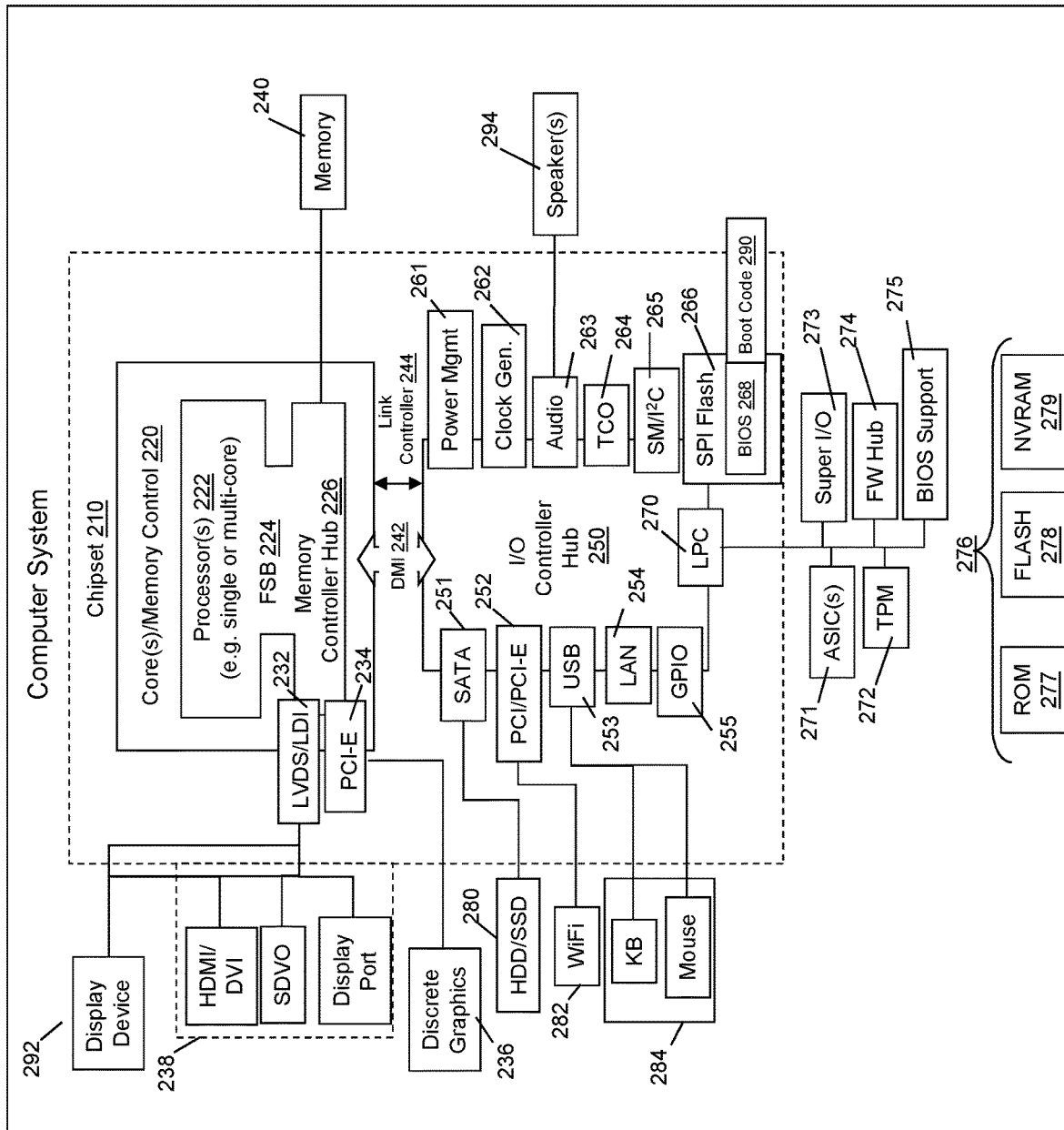
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems for performing shock analysis on packages to detect possible object damage. For example, the circuitry outlined in FIG. 1 may be implemented in a tablet or smart phone embodiment, whereas the circuitry outlined in FIG. 2 may be implemented in a personal computer embodiment.

Figure 3:
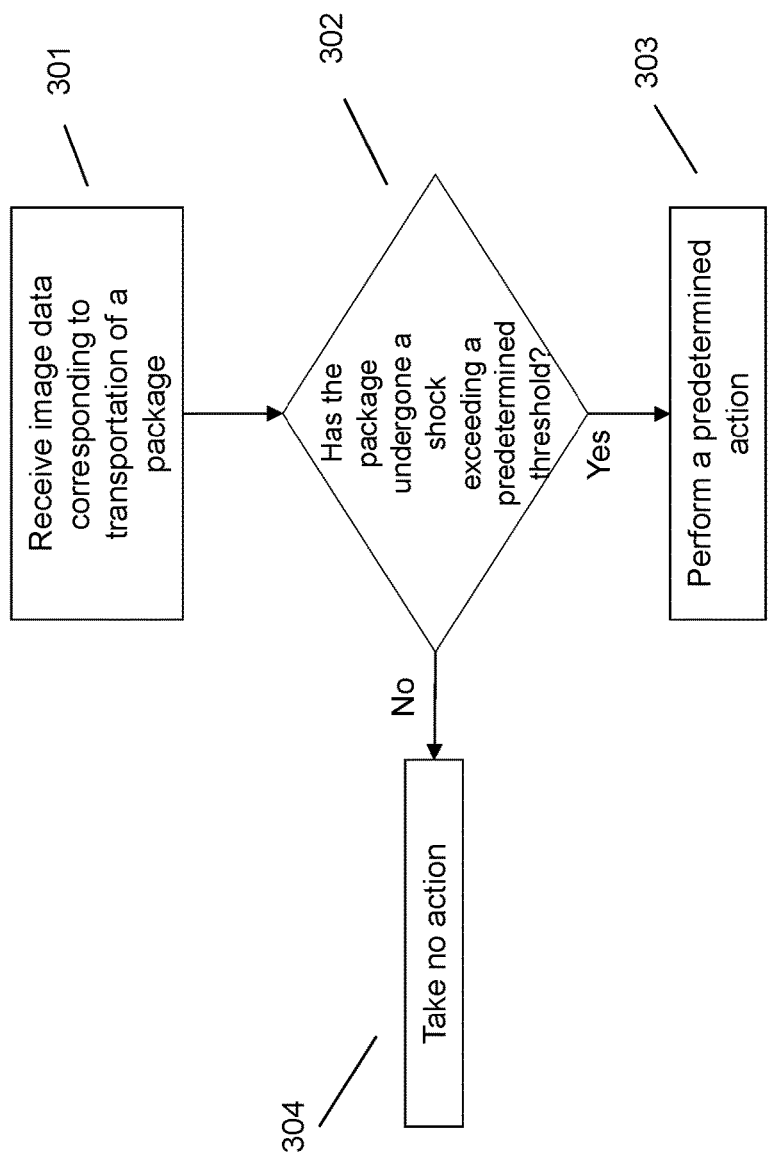
FIG. 3 illustrates an example method for identifying when a package has undergone a shock exceeding a predetermined threshold through image analysis.

FIG. 3 illustrates an example method for identifying when a package has undergone a shock exceeding a predetermined threshold through image analysis. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to identify when a package has undergone a shock of a large enough magnitude to cause damage to the package or objects within the package even if damage is not visible to the outside of the package. Additionally, the shock analysis system includes modules and features that are unique to the described system.

At 301 a shock analysis system receives image data corresponding to at least one image capture device (e.g., camera, video camera, other device/system that can tell where a package is and its motion through space, etc.) and is associated with transportation of a package. The shock analysis system may include one or more image capture devices that are affixed to different locations that allow for capturing image data that is related to movement of a package. While a camera will be the primary device that is discussed, this is intended only for ease of readability and is not intended to limit the scope of this disclosure to only a camera as other image capture devices may be utilized. The locations may include locations within a facility where packages are moved from one point to another, for example, a packaging facility, a warehouse, or the like. The packages may be moved from one location to another, for example, a packaging location to a storage location, a storage location to a delivery truck, and the like. In this location, the image capture device, or multiple image capture devices, may be located so that all the locations that the package may be within the facility are captured.

The locations may also include vehicles that are used to transport the packages, for example, transportation carts, forklifts, pallet jacks, delivery trucks, transportation trucks, and the like. Thus, the vehicles may not only be vehicles that are used with a facility, but also include vehicles that are used to transport the packages from one facility to another location. The locations may also include locations on the packages themselves. For example, one package may be selected as a representative package for a group of packages and the image capture device may be affixed to that package. In these locations, where the image capture device is affixed to a representative package or a vehicle transporting the package, the image capture device would not need to be positioned so that images of all the packages are captured. Rather, the image capture device or image capture devices can be positioned to capture some of the packages or even none of the packages and instead positioned to capture the environment surrounding the packages.

As the image capture device is utilized, image data is captured. While a single image capture device is discussed herein, it should be understood that the shock analysis system can include multiple image capture devices that capture images of the same set of packages, images of different sets of packages, a combination thereof, or the like. For example, in a vehicle implementation, one image capture device may be positioned to capture images of a left side of the vehicle including packages on that side, another image capture device may be positioned to capture images of a right side of the vehicle including packages on that side, and a third image capture device may be positioned to capture images of an environment surrounding the packages.

The image data may include video of the package as the package is being transported. This image data may be video that shows all movement of the package as it is being transported. Depending on the location of the camera, specifically whether it is mounted on a vehicle or a stationary location, the image data of the package may appear to be mostly still or may show the package during all movements. In other words, if the camera is mounted to a vehicle transporting the package, the package will generally appear to be still because it moves with the vehicle. Thus, the only movements of the package in such images will be when the package moves independently from the movement of the vehicle. On the other hand, if the camera is mounted at a stationary location, any movement of the package during transportation, including the transportation itself, will be captured and viewable within the image data.

The image data may include video of an environment surrounding the package as the package is being transported. This image data will show objects around the package as the package is being transported. Like the package image data, this image data can be captured using either a vehicle mounted camera or a stationary camera. However, this image data will generally be more useful in the vehicle mounted camera application. In this use case, the image data will show environment objects "moving" by the camera as the vehicle is moving through the environment. While the environment objects themselves may or may not actually be moving, they will appear to be moving in the image data because the camera is moving relative to the environment objects, thereby giving the environment objects the appearance of movement.

The image data may also include data other than images. The image data may include data corresponding to the image capture device that is capturing the images of either the package and/or the environment surrounding the package. The data of the image capture device may include vibration data or other movement information of the image capture device. The image capture device may include sensors, for example, vibration sensors, accelerometers, gyroscopes, and/or the like, that can capture movement information of the camera. Vibrations and other motions of the camera would be recorded by the movement sensors. For example, if the camera is mounted using camera mounts, the mounts will flex and move through shocks and vibrations. These flexes will be also "felt" by the camera itself, which can be captured using the movement sensors. This movement information, if available, will be included with the image data.

At 302, the shock analysis system determines if the package has undergone a shock of a magnitude exceeding a predetermined threshold. To make this determination, the shock analysis system analyzes the image data. In other words, the shock analysis system utilizes computational logic to analyze the image data and determine when any shocks may have occurred during the transportation of the package. Shocks that can damage objects in the package occur with an abrupt change in velocity, for example, when a vehicle carrying the package runs into an object, when the package falls, when a vehicle carrying the package abruptly accelerates, and the like. Thus, when analyzing the image data, the shock analysis system is looking for these abrupt changes in velocity.

The calculation for velocity is distance divided by time and includes a direction of the movement. The shock analysis system knows the frame rate of the image data. In other words, the shock analysis system knows how long elapses between each frame. The frame rate information may be provided to the shock analysis system via the image data, for example, metadata included with the image data. If the shock analysis system is integral to the image capture device, the image capture device knows its programmed frame rate. Thus, when movement of the package is detected, the shock analysis system can analyze the image data to determine the distance the package travels from one frame to another frame. Since the frame rate is known, the system can simply divide the distance by the time between the frames in which the distance measurement was taken to determine the velocity of the package.

Similar calculations can be performed when the image data is of the environment surrounding the package or the camera movement. If the image data is of the environment surrounding the package, the environment objects will move at a consistent rate through the image data as the vehicle is moving at a consistent rate. If the vehicle experiences a sudden stop, sudden start, or other change in velocity, the environment objects will appear to undergo the same change in velocity. Thus, in a manner as previously discussed, a distance can be measured between the location of the object in one frame as compared to the location of the object in another frame. The frame rate can then be used as the time component of the velocity calculation, thereby providing a velocity measurement of the object which can then be attribute to the velocity of the package. If the image data is of the camera movement, the camera movement will cause objects in the frame to appear to move. Thus, the technique to calculate velocity as described before can be used on this image data also.

Once the velocity is calculated, the shock analysis system can monitor for abrupt changes in velocity. Thus, the system not only calculates the velocity once, but calculates the velocity multiple times over different frames. In order to reduce the amount of processing, the system may only calculate the velocity when a movement of interest (e.g., movement of the package, inconsistent movement of an environment object, movement of an object in a frame when monitoring camera movement, etc.) is detected. The velocity from one frame to the next can then be compared to determine the change in velocity between frames. This comparison provides a value for a change in velocity, which corresponds to the change in velocity of the package even if the package itself is not directly monitored (e.g., environment objects or camera movement is monitored, etc.).

The change in velocity is then compared to a predetermined threshold. The predetermined threshold is a value that is correlated to a shock that is of a magnitude to potentially cause damage to an object within the package. In other words, the predetermined threshold has been set to a value that would indicate that the object may have undergone damage if the value is met or exceeded. The predetermined threshold may be a default value, set by a user, or the like. Additionally, the predetermined threshold may change depending on the objects within the packages. For example, objects more sensitive to shocks may have a lower threshold value as compared to objects that are more robust against shocks. If multiple packages are being monitored that have different sensitivities to shocks, the threshold may be set to a value that corresponds to the lowest shock value or change in velocity. Stated differently, the threshold may be set to correspond to the most sensitive object value.

The shock analysis system may have multiple predetermined threshold values. A second threshold value may be utilized that is lower than the first predetermined threshold value. This second threshold may correspond to a value where damage might occur to the object, but is not definitively going to cause damage, whereas the first threshold value may correspond to a value where damage is all but certain to occur. In other words, velocity change values between this second threshold value and the first threshold value are a gray area where damage may or may not occur to the object within the package.

If the system determines that the package has not undergone a shock having a magnitude exceeding a predetermined threshold at 302, the system may take no action at 304. In other words, if the shock analysis system determines that the change in velocity is less than the predetermined threshold value, the system may take no action at 304. In the case that multiple thresholds are utilized, the system may take no action at 304 when the change in velocity value is less than all the threshold values.

If, on the other hand, the system determines that the package has undergone a shock having a magnitude exceeding the predetermined threshold at 302, the system may perform at least one predetermined action at 303. The at least one predetermined action may at least include notifying a user of the shock. Notifying a user of the shock may include sending an alert to a user that a shock has occurred that exceeds the set threshold. The system may also mark or flag the image data at a time corresponding to a time of occurrence of the shock. This allows a user reviewing the image data to quickly access the location in the image data that corresponds to the shock and determine what caused the shock.

In the case that multiple thresholds are utilized, the system may take different actions. Using the example of the two thresholds where the second threshold is lower than the first threshold, the system may simply mark the image data at a time corresponding to a time of occurrence of the shock and may not notify or alert a user of the shock. This allows a user to quickly identify if a shock that might have caused damage occurred. This would be useful if a consumer complained of damage to an object, but the shock did not rise to the level of alerting the user. The user could then review the image data and quickly identify possible causes of damage.

The system may also add metadata to the image data if the shock value exceeds one or more of the thresholds. For example, the system may add the change in velocity values to the image data. Thus, not only can a user review the image data to see the shock occur, but the user is also able to see the change in velocity value that was calculated by the system. Another piece of metadata that the system may add is a location of the shock, for example, a geographical location, a facility location, a vehicle location, and/or the like. Other types of metadata may include, information related to a person providing the transportation, a load size being transported, or any other information that may be helpful to a user in understanding the cause of the shock or preventing future shocks from occurring to other packages.

The shock analysis system may be integrated into the image capture device that is capturing the image data. In other words, the image capture device may include additional functionality that allows the image capture device or processors of the image capture device to perform the image analysis and determine if the package has undergone a shock of a magnitude exceeding a threshold and also perform the at least one predetermined action. On the other hand, the shock analysis system may include multiple components including an image capture device for capturing the images and an additional component, for example, a central processor or central system, performs the image analysis, determination, and performs the predetermined action. In this example, the additional component would not be integral to the image capture device and is instead a stand-alone component that is operatively coupled to the image capture device, for example, using wireless or wired communication, through an intermediary component (e.g., cloud network, remote network, local network, data storage location, etc.), or the like.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
receiving, at a shock analysis system, image data corresponding to at least one image capture device and associated with transportation of a package, wherein the image data comprises video, captured by the at least one image capture device, of the package as the package is being transported and metadata surrounding the at least one image capture device as the package is being transported, wherein the metadata comprises at least one of: vibration data, movement data, and frame rate information;
determining, at the shock analysis system and by analyzing the image data, the package has undergone a shock of a magnitude exceeding a predetermined threshold, wherein the shock of the magnitude occurs at an abrupt change in velocity, wherein the shock analysis system calculates the abrupt change in velocity from the image data; and
performing, at the shock analysis system and responsive to determining the package has undergone the shock exceeding the predetermined threshold, at least one predetermined action, wherein the at least one predetermined action comprises notifying a user of the shock.

2. The method of claim 1, wherein the image data comprises video, captured by the at least one image capture device, of an environment surrounding the package as the package is being transported.

3. The method of claim 1, wherein the image data comprises data corresponding to a movement of the at least one image capture device capturing images of at least one: the package and the environment surrounding the package.

4. The method of claim 1, wherein the at least one predetermined action further comprises marking the image data at a time corresponding to a time of occurrence of the shock.

5. The method of claim 1, comprising determining the package has undergone a shock of a magnitude exceeding a second predetermined threshold but not exceeding the predetermined threshold.

6. The method of claim 5, comprising marking, responsive to determining the shock has exceeded the second predetermined threshold, the image data at a time corresponding to a time of occurrence of the shock.

7. The method of claim 1, wherein the at least one image capture device is coupled to at least one of: the package and a vehicle transporting the package.

8. The method of claim 1, wherein the shock analysis system is integrated into the image capture device capturing the image data.

9. An information handling device, the information handling device comprising:
at least one image capture device;
a processor operatively coupled to the at least one image capture device;
a memory device that stores instructions that, when executed by the processor, causes the information handling device to:
receive, at a shock analysis system, image data corresponding to the at least one image capture device and associated with transportation of a package, wherein the image data comprises video, captured by the at least one image capture device, of the package as the package is being transported and metadata surrounding the at least one image capture device as the package is being transported, wherein the metadata comprises at least one of: vibration data, movement data, and frame rate information;
determine, at the shock analysis system and by analyzing the image data, the package has undergone a shock of a magnitude exceeding a predetermined threshold, wherein the shock of the magnitude occurs at an abrupt change in velocity, wherein the shock analysis system calculates the abrupt change in velocity from the image data; and
perform, at the shock analysis system and responsive to determining the package has undergone the shock exceeding the predetermined threshold, at least one predetermined action, wherein the at least one predetermined action comprises notifying a user of the shock.

10. The information handling device of claim 9, wherein the image data comprises video, captured by the at least one image capture device, of an environment surrounding the package as the package is being transported.

11. The information handling device of claim 9, wherein the image data comprises data corresponding to a movement of the at least one image capture device capturing images of at least one: the package and the environment surrounding the package.

12. The information handling device of claim 9, wherein the at least one predetermined action further comprises marking the image data at a time corresponding to a time of occurrence of the shock.

13. The information handling device of claim 9, comprising determining the package has undergone a shock of a magnitude exceeding a second predetermined threshold but not exceeding the predetermined threshold.

14. The information handling device of claim 13, comprising marking, responsive to determining the shock has exceeded the second predetermined threshold, the image data at a time corresponding to a time of occurrence of the shock.

15. The information handling device of claim 9, wherein the at least one image capture device is coupled to at least one of: the package and a vehicle transporting the package.

16. A product, the product comprising:
a computer-readable storage device that stores executable code that, when executed by a processor, causes the product to:
receive, at a shock analysis system, image data corresponding to at least one image capture device and associated with transportation of a package, wherein the image data comprises video, captured by the at least one image capture device, of the package as the package is being transported and metadata surrounding the at least one image capture device as the package is being transported, wherein the metadata comprises at least one of: vibration data, movement data, and frame rate information;
determine, at the shock analysis system and by analyzing the image data, the package has undergone a shock of a magnitude exceeding a predetermined threshold, wherein the shock of the magnitude occurs at an abrupt change in velocity, wherein the shock analysis system calculates the abrupt change in velocity from the image data; and
perform, at the shock analysis system and responsive to determining the package has undergone the shock exceeding the predetermined threshold, at least one predetermined action, wherein the at least one predetermined action comprises notifying a user of the shock.

\* \* \* \* \*